United States Patent [19]

Rasmussen

[11] Patent Number: 4,999,056

[45] Date of Patent: Mar. 12, 1991

[54] METHOD AND A COMPOSITION FOR PREPARING A SHAPED ARTICLE

[75] Inventor: Thorkild H. Rasmussen, Norrehave, Denmark

[73] Assignee: Densit A/S Rordalsuej, Denmark

[21] Appl. No.: 171,005

[22] PCT Filed: Jul. 15, 1987

[86] PCT No.: PCT/DK87/00091

§ 371 Date: Mar. 10, 1988

§ 102(e) Date: Mar. 10, 1988

[87] PCT Pub. No.: WO88/00575

PCT Pub. Date: Jan. 28, 1988

[30] Foreign Application Priority Data

Jul. 15, 1986 [DK] Denmark .............................. 3371/86

[51] Int. Cl.$^5$ ......................... C04B 7/02; C04B 14/04
[52] U.S. Cl. .................................... 106/737; 106/724; 106/725; 106/726
[58] Field of Search .................. 106/90, 98, 314, 315, 106/724, 725, 737

[56] References Cited

U.S. PATENT DOCUMENTS

| | | | |
|---|---|---|---|
| 3,689,294 | 9/1972 | Brunauer ............................... | 106/90 |
| 4,111,711 | 9/1978 | Kiehl et al. .......................... | 106/97 |
| 4,345,944 | 8/1982 | Kazama et al. ....................... | 106/90 |
| 4,391,645 | 7/1983 | Marcellis et al. ................... | 106/314 |
| 4,406,702 | 9/1983 | Joseph .................................... | 106/90 |
| 4,441,929 | 4/1984 | Marcellis et al. ................... | 106/314 |
| 4,447,266 | 5/1984 | Nachfolger ........................... | 106/90 |
| 4,505,753 | 3/1985 | Scheetz et al. ....................... | 106/90 |

FOREIGN PATENT DOCUMENTS 2730943 1/1978 Fed. Rep. of Germany ........ 106/98

*Primary Examiner*—William R. Dixon, Jr.
*Assistant Examiner*—Anthony J. Green
*Attorney, Agent, or Firm*—Bryan, Cave, McPheeters & McRoberts

[57] ABSTRACT

A shaped article with a binder matrix based on cement is prepared from a mix comprising the cement, water, and a concrete super-plasticizer, the weight ratio between the water and the cement being at the most 0.30, preferably at the most 0.25, arranging the mix in the desired configuration and allowing the mix to solidfy, in which mix the weight amount of water-soluble alkali in the mix originating from the mineral solids in the mix is reduced to at the most 0.30%, preferably at the most 0.25%, more preferably at the most 0.20%, calculated as $Na_2O$ equivalents, relative to the weight of the cement in the mix. The mix preferably further contains a fine silica-rich powder. The mix has an advantageously high fluidity rendering it useful for the preparation of shaped articles.

48 Claims, No Drawings

METHOD AND A COMPOSITION FOR PREPARING A SHAPED ARTICLE

The present invention relates to a method and a composite material mix for preparing a shaped article with a binder matrix based on cement a concrete superplasticizer, and water, in particular based on cement, a silica-rich powder, a concrete superplasticizer, and water.

In the present context, the term "shaped article" designates any kind of structure formed by solidification of such a cement-containing mix.

When preparing shaped articles comprising binder matrices based on cement and water, it is of great importance for the quality of the final shaped article that the mix has suitable flow properties so that it will fill the cavity in which it is to be cast. It is also important that the mix has a high degree of homogeneity, so that, for example, there are no large agglomerates of, e.g., silica particles which would affect the quality, e.g., the durability of the final cast article. Thus, the ideal is to obtain a good flow and a high degree of homogeneity, as low content of water as possible, as it is known that the quality of the final shaped article such as the compressive strength, the durability, etc. is the higher, the lower the water content is. With badly dispersed systems, a higher water content in the mix is necessary in order to obtain the required fluidity. By adding more water, the necessary fluidity may be obtained, but in a system which is not well dispersed, this does not ensure the desired homogeneity of the fine powders. The problems in connection with the achievement of homogeneity are greater when dealing with a binder matrix system comprising two fine powder components such as cement and a fine silica-rich powder, the reason for this being that an intermixing of the two different powders is required as a basic necessity for obtaining homogeneity.

The smaller the fine silica-rich particles are, the more difficult is it to obtain the desired homogeneity, because locking surface forces will tend to counteract the homogeneous distribution and locking surface forces increase with decreasing size of the particles. Thus, when going from medium fine particles such as cement (typical specific surface 400 m$^2$/kg) to ultra-fine silica fume with a surface of typically 25,000 m$^2$/kg, there is a dramatic increase in the surface forces to be overcome. These problems are especially pronounced in systems with a low water content and are also very pronounced in systems with a high content of ultra-fine silica.

It is known in the art to reduce the water content or improve the fluidity of cement mixes by adding a surface-active dispersing agent, such as a concrete superplasticizer. However, even the use of concrete superplasticizers will not always eliminate the problems associated with obtaining a good flow and homogeneity at a low water content.

According to the present invention, it has been found that the fluidity and homogeneity of mixes based on cement, a concrete superplasticizer, and water, in particular based on cement, a fine silica-rich powder, a concrete superplasticizer, and water, are strongly improved by reducing the water-soluble alkali content of the cement (and of the fine silica when present).

Thus, in one aspect, the invention relates to a method for preparing a shaped article with a binder matrix based on cement by preparing a mix comprising the cement, water, and a concrete superplasticizer, the weight ratio between the water and the cement being at the most 0.30, preferably at the most 0.25, arranging the mix in the desired configuration and allowing the mix to solidify, characterized in that the weight amount of water-soluble alkali in the mix originating from the mineral solids in the mix is reduced to at the most 0.30%, preferably at the most 0.25%, more preferably at the most 0.20%, calculated as $Na_2O$ equivalents, relative to the weight of the cement in the mix.

In the very important aspect where a fine silica-rich powder is incorporated, the invention relates to a method for preparing a shaped article with a binder matrix based on cement and fine silica-rich powder by preparing a mix comprising the cement, the fine silica-rich powder, water, and a concrete superplasticizer, arranging the mix in the desired configuration and allowing the mix to solidify, characterized in that the weight amount of water-soluble alkali in the mix originating from the mineral solids in the mix is reduced to at the most 0.30%, preferably at the most 0.25%, more preferably at the most 0.20%, calculated as $Na_2O$ equivalents, relative to the weight of the cement in the mix.

In the present context, the term "cement" is intended to designate all cements of the Portland cement type, including white Portland cement, low-alkali cements, sulphate-resistant cements, Portland slag cement, and Portland pozzolana cement, and cements of the refractory or aluminate type, blast furnace cements and pozzolanic cements.

It is well-known (cf. B. Osbaeck: "Zement-Kalk-Gips", 37 (1984) 9, p486–493) that water-soluble alkali in cements is predominantly present in the form of alkali sulphates such as sodium or potassium sulphate which form a separate phase in cement clinker. However, the amount of water-soluble alkali is usually expressed as alkali metal oxide (e.g. $Na_2O$ or $K_2O$) equivalents. Water-soluble alkali in silica fume and fly ash can be present as alkali sulphates condensed on the surface.

Applicants have established that the presence of water-soluble alkali in the form of alkali metal sulphates exerts its influence as a result on the one hand of the presence of sulphate ions, the mechanism of which is discussed in further detail below, and on the other hand, the high solubility product of alkali metal sulphates as opposed to calcium sulphate. It has also been established that the presence of water-soluble alkali in the form of hydroxides exerts a similar influence as discussed below. Consequently, defining the component, the content of which is desirably reduced by the method of the invention, as water-soluble alkali is clearly applicable when considering the normal composition of cements. However, as a result of the above discussed natural composition of water-soluble alkali in cements, the water-soluble alkali is, as noted above, predominantly alkali sulphate.

Without being bound to any particular theory, the experiments recounted in the examples below indicate that the presence of too high a content of water-soluble alkali in a cement mix comprising cement, water and a concrete superplasticizer and optionally also a fine silica-rich powder, reduces the adsorption of concrete superplasticizers on the surface of the particles in the mix. The current knowledge about concrete superplastification is that the concrete superplasticizers, which are normally various sulphonic acid compounds, must be adsorbed on the surface of the cement or silica particles in order to disperse the particles, thereby allowing greater packing density of the particles in the mix which in turn gives a denser hardened cement material.

It is contemplated that the presence of sulphate ions in concentrations corresponding to the content of water-soluble alkali given above interferes with the process of adsorption of concrete superplasticizer on the surface of cement or silica particles. The process is probably due to the fact that a high concentration of sulphate in the pore liquid precipitates part of the amount of dissolved calcium ions that are normally present in the pore liquid in cement mixes made from low-alkali cements. Calcium ions, probably due to their divalent nature, seem to function as abridging ion between on the one hand the moieties (such as silicate or aluminate) fixed on the surface of the particulate material and on the other hand the negatively charged sulphonic acid-containing concrete superplasticizer. If the concentration of calcium ions in the pore liquid, through the presence of excessive amounts of sulphate ions, is reduced through precipitation, the negatively charged concrete superplasticizer is not able to adsorb unto the surface of the particles. As a result of this, the concrete superplasticizer is not able to exert its density packing-promoting effects on the surfaces of the particles, which fact in turn leads to a higher water requirement of the cement mix and consequently a low and undesired flowability of the mix.

In the aqueous solution of the mix, water-soluble alkali originating from the mineral solids in the mix results in increased concentrations of alkali ions, sulphate ions, and, to a minor extent, hydroxide ions, as well as a decreased concentration of calcium ions. This will also be the case if the water-soluble alkali is in the form of alkali hydroxide. Alkali salts comprising anions capable of forming a soluble calcium salt are not able to precipitate calcium ions in the aqueous solution of the mix and do not affect the concentration of calcium ions and hydroxide ions appreciably. Concrete superplasticizers usually comprise anions capable of forming a soluble calcium salt. It is believed that addition of alkali salts of concrete superplasticizers in excess of what can be adsorbed on the surface of the particles does not affect the concentration of calcium ions and hydroxide ions appreciably.

Alkali in the form of a salt comprising anions capable of forming soluble calcium salts also affects the fluidity of the mix adversely, but to a much lower extent than water-soluble alkali originating from the mineral solids in the mix. In the examples, it is illustrated that alkali introduced in the mix as a salt of a concrete superplasticizer, beyond the amount giving optimum fluidity, decreases the fluidity of the mix only slightly.

The reduction of the amount of water-soluble alkali originating from the mineral solids to below the limit values given above may be brought about by (1) selecting a cement and/or a fine silica-rich powder that will result in a content of water-soluble alkali in the mix below the limits specified above or (2) adding to the mix or any of its constituents (i) a water-soluble salt comprising non-alkali metal cations capable of forming a substantially insoluble precipitate with sulphate ions, or (ii) an acid capable of forming a water-soluble Ca-salt or (iii) a salt comprising non-alkali metal cations and capable of forming a soluble calcium salt through reaction with calcium hydroxide.

The principle is alternative (1) for reducing the amount of water-soluble alkali will be understood by the person skilled in the art based on the mechanistic discussion above. Equally, the reasoning behind alternative (2)i) is also clear when seen against the discussion above as well as the experiments described in the examples. The possibility in alternative (b 2)ii) is based on the fact that the addition of an acid to the pore liquid would cause the dissolution of some of the solid calcium hydroxide in the mix, thereby releasing calcium ions into the pore liquid which in turn would counteract the effect of the water-soluble alkali originating from the mineral solids in the mix. The acid capable of forming a water-soluble Ca-salt could be any acid fulfilling this requirement. Thus, hydrochloric or nitric acid could theoretically be used however, a preferred acid is a sulphonic acid group-containing concrete superplasticizer in the acid form (as opposed to the normally used salt forms such as the sodium salt form). Likewise, the principle in (2)iii) is based on bringing more calcium into solution by addition of a salt with non-alkali cations having a hydroxide that is less soluble than calcium hydroxide.

The amounts of additions in (2)i), (2)ii), and (2)iii) should be so that a reduction of the amount of water-soluble alkali in the mix to below the levels given above is achieved and may be easily determined by the person skilled in the art by simple preliminary experiments based on the teaching herein.

A preferred example of a non-alkali metal cation capable of forming a substantially insoluble precipitate with sulphate ions are $Ca^{2+}$ ions. The addition of such cations will precipitate the unwanted sulphate ions in the pore liquid.

In accordance with the normal art of preparing shaped articles with matrices based on cement and water, additional bodies such as aggregate, in particular sand and/or stone, are normally also incorporated in the mix. Furthermore, fibres, such as steel fibres, plastic fibres, Kevlar fibres, glass fibres, asbestos fibres, cellulose fibres, mineral fibres, high temperature fibres, whiskers, including non-metallic whiskers such as graphite and $Al_2O_3$ whiskers and metallic whiskers such as iron whiskers, and organic fibres, such as plastic fibres, may be incorporated in the mix.

The fine silica-rich powder may be any powder having the same fineness as the cement or a greater fineness, typically a silica-rich powder with a Blaine surface of from about 200 $m^2/g$, in particular from about 400 $m^2/g$ to about 25000 $m^2/kg$ or greater. Examples of the fine silica-rich powder are artificial fine silica-rich powders such as ultra-fine silica produced from gas phase ("silica fume"), fly ash such as fly ash from power plants, in particular fine fractions thereof, and natural products such as diatomaceous earth. An especially interesting fine silica-rich powder is ultra-fine silica fumed produced as a by-product in the production of furnaces.

The alkali in Portland cement without mineral admixtures originate from the raw materials for burning of cement clinker, part of which becomes water-soluble during cement grinding. The alkali in slag, cement of the aluminate type, silica-fume and fly ash is also incorporated during high temperature processes.

The term "originating from the mineral solids of the mix" is intended to indicate that the water-soluble alkali (in particular K and Na) originate from the cement and silica or other mineral powders incorporated in the mix the alkali being incorporated during high temperature processes, when high temperature processes are used for the manufacture of the mineral solids. Any alkali introduced in the mix as a salt of a superplasticizer (when the superplasticizer is a salt, vide below) is not included in the percentages stated above.

The mix is normally prepared as a fluid to plastic mix with a weight ratio between water and cement+silica of at the most 35, preferably at the most 30. Mixes with a low water content are also very interesting, for example mixes with a weight ratio between water and cement+silica of at the most 25, such as at the most 20, e.g., at the most 15 per cent by weight.

In many interesting matrices according to the principles of the invention based on cement and fine silica-rich powder, the proportion of the fine silica powder in the mix is often at least 10 per cent by weight, such as at least 15 per cent by weight, e.g. at least 20 per cent by weight, such as at least 30 per cent by weight, e.g. at least 40 per cent by weight, calculated on the cement+the fine silica.

As examples of concrete superplasticizers may be mentioned salts of condensed naphthalene-sulphonic acid/formaldehyde condensates and melamine sulphonic acid/formaldehyde condensates.

According to the invention, it has been found that when the concrete superplasticizer, in the form of a salt is used in which at least part of the salt-forming cations of the concrete superplasticizer are non-alkali cations, this may be utilized to compensate for a somewhat too high content of water-soluble alkali in a cement. Thus, according to a modification of the method of the invention, the content of water-soluble alkali in the mix originating from the mineral solids in the mix may be higher than the respective contents stated above, the higher content being compensated for a corresponding deficiency of the alkali cations in the concrete superplasticizer compared to the total molar cation capacity of the plasticizer. In the examples, it is illustrated how the exchange of part of the "normal" Na content of a concrete superplasticizer with Ca makes it possible to prepare well-flowing mixes with such a Ca-modified superplasticizer using cements with contents of water-soluble alkali which are so high that they would not result in well-flowing mixes with the same superplasticizers with exclusively water-soluble alkali as the salt-forming cations. In such a case, the "extra" content of water-soluble alkali originating from the mineral solids which can be tolerated in the mix seems to correspond rather well with the "reduced" amount of alkali cations introduced in the mix by the superplasticizer.

In an important aspect of the invention, the mixes prepared are mixes for producing the so-called "DSP-materials" (high density, high quality cement/ultra-fine silica-based materials) of the type disclosed in International Patent Applications WO 80/00959 and WO 81/03170, and in "Densified Cement/Ultra-Fine Particle-Based Materials", presented by H. H. Bache at The Second International Conference on June 10-12, 1981 in Ottawa, Canada.

In this aspect, the invention may, e.g., be expressed as a method as described above wherein the particle size of the fine silica-rich powder is from about 50 Å to about 0.5 $\mu$m, the cement particles are of a size from 0.5 to 100 $\mu$m and at least one order of magnitude larger than the respective fine silica-rich particles, the cement particles optionally being admixed with other particles of substantially the same size such as, e.g. fine sand, fly ash or fine chalk, the cement particles and optionally other particles of the same particle size range being substantially densely packed in the mix, the fine silica-rich particles being substantially homogeneously distributed in the volume between the cement particles and optional other particles of the same particle size, the mix optionally additionally comprising additional bodies which have at least one dimension which is at least one order of magnitude larger than the cement particles, the mix comprising an effective concrete superplasticizer in a sufficient amount to secure the homogeneous distribution of the fine silica-rich particles. The dense packing referred to above as substantially a packing corresponding to the one obtainable by gentle mechanical influence on a system of geometrically equally shaped large particles in which locking surface forces do not have any significant effect. The amount of the dispersing agent is normally the amount sufficient to impart to the mix a fluid to plastic consistency in a low stress field of less than 5 kg/m$^2$, preferably less than 100 g/cm$^2$. The mixing times used for these mixes are normally longer, often considerably longer than the usual mixing times used in conventional concrete technology, often of the order of 5-10 minutes or even longer.

The fine silica-rich particles in this aspect of the invention will typically have a specific surface area of about 50,000–2,000,000 cm$^2$/g, in particular about 250,000 cm$^2$/g. It is often preferred that at least 20 per cent by weight, or at least 50 per cent by weight, of the cement particles and the optional other particles of the same particle size range comprise Portland cement.

In this aspect of the invention, the amount of superplasticizer dry matter will often be in the range of 1–4% by weight, calculated on the total weight of the cement and the silica-rich fine powder, and the weight ratio between the water and the cement (and other particles of the cement size)+the fine silica-rich particles will normally be in the range between 0.12 and 0.30, preferably 0.12 to 0.25, such as 0.12 to 0.20.

Further details concerning these materials appear from the claims.

The invention also relates to mixes fulfilling the above-identified requirements. These mixes may be wet mixes, or they may be dry mixes with a composition adapted to fulfill the above requirements upon addition of the appropriate amount of water.

The invention is illustrated in greater detail in the following examples.

EXAMPLE 1

In this example, 15 different cements with varying contents of water-soluble alkali (expressed as Na$_2$O-equivalents) were tested for their ability to give DSP-mixtures with a good flowability.

Materials
Cements
1. Danish Portland cement (type PC(A/L/S)), low-alkali sulphate-resistant, from Aalborg Portland-Cement-Fabrik, Aalborg, Denmark
2. Danish Portland cement (type PC(R/L/H)), White Portland cement, from Aalborg Portland-Cement-Fabrik, Aalborg, Denmark
3. Danish Portland cement (type PC(A)), from Aalborg Portland-Cement-Fabrik, Aalborg, Denmark
4. US cement type I (according to ASTM-C-150), from Independent Cement Co., USA
5. US cement type II (according to ASTM-C 150), from Medusa Cement Co., USA
6. US cement type III (according to ASTM-C-150), from Martin-Marietta Corp. USA
7. US cement type V (according to ASTM-C-150)
8. White cement, from Italcementi, Italy
9. White cement, Italy 10. White cement, type Lafarge Superblanc from Lafarge, France
11. White cement, from Alsen-Breitenburg, West Germany
12. A 1:1 mixture of cement No. 3 and cement No. 2
13. Cement No. 1 having added 1.4% by weight of $K_2SO_4$
14. White cement, from Lehigh Cement Co., Waco, Texas, U.S.A.
15. A mixture of 70% by weight of cement No. 2 and 30% by weight of cement No. 3.

Superplasticizers
1. Na-CemMix; a Na-salt of formaldehyde-condensed naphthalene sulphonate as a 42% by weight solution in water; from KaoSoap, Japan.
2. Ca-CemMix; corresponding to Na-CemMix but having part of the sodium ion content substituted by calcium ions (Na 5.42%; Ca 7.47%), from Kao-Soap, Japan.
3. Flube CR140; a Ca/Na-salt of formaldehyde-condensed naphthalene sulphonate (Na 2.02%; Ca 6.15% of dry matter), from Giovanni-Bozetto, Italy.

Silica fume:
Elkem Silica, from Elkem-Spigerverket, Norway.
Particle size distribution:

| | |
|---|---|
| >44 μm | 0.3–3.5% |
| >10 μm | 1.5% |
| >5 μm | 7% |
| >1 μm | 10% |
| >0.5 μm | 19% |

Specific surface: 18–22 m$^2$/g

Methods

The DSP-mixtures were prepared in the following manner: 387 g cement, 92 g silica fume, 99 g quartz sand (0.0.25 mm), 197 g quartz sand (0.25–1 mm), 395 g quartz sand (1.4 mm), 29 g 42% aqueous superplasticizer solution, and 55 g water were mixed for 10 minutes on a Hobart-mixer at 140 rpm. Thereafter, further 7 g superplasticizer solution and 14 g water were added followed by further mixing for 6 minutes under the same conditions. Finally, the flow properties of the mixture were determined on a ASTM-C-230 flow table by first determining the initial flow and subsequently determining the flow after 20 strokes. The results were expressed as the increase of the original (cone) diameter.

The contents of K and Na were measured by means of atomic absorption spectrophotometry according to ASTM C-114 and were calculated as $K_2O$ and $Na_2O$-equivalents, respectively.

In Table 1 below, the following data for the various cements are given: contents of various cement minerals ($C_3S$, $C_2S$, $C_3A$, $C_4AF$, $CaSO_4$, free CaO, $K_2O$, $Na_2O$), water-soluble $K_2O$ and $Na_2O$, loss on ignition, Blaine surface area (cm$^2$/g), time in minutes for consistency or flow change during mixing of the DSP-mixture, coherence (±) of DSP—mixture, general flowability (±) of DSP—mixture and flowability measured on ASTM-C-230 flow table. In the experiments covered by table, only Na-CemMix was used.

In Table 2 below, data are given for experiments with some of the above-described cements with Ca-containing superplasticizers, namely cement No. 1, 3, 6, and 7. For each experiment, the table lists the cement and superplasticizer, time for flow change, cohesion, general flow, and flow values according to ASTM-C-230.

TABLE 1

| | | Cement No. | | | | |
|---|---|---|---|---|---|---|
| | | 1 | 2 | 3 | 4 | 5 |
| $C_3S$ | % | 54.4 | 71.8 | 49 | 51.4 | 52.6 |
| $C_2S$ | % | 28.2 | 14.5 | 21 | 22.1 | 22.5 |
| $C_3A$ | % | 1.20 | 3.68 | 9 | 8.59 | 3.34 |
| $C_4AF$ | % | 8.86 | 1.10 | 9 | 5.57 | 10.10 |
| $CaSO_4$ | % | 3.34 | 2.83 | 3 | 3.19 | 2.56 |
| Free CaO | % | 0.86 | 3.22 | 1.2 | 0.81 | 0.97 |
| $K_2O$ | % | 0.18 | 0.06 | 0.52 | 0.84 | 0.73 |
| $Na_2O$ | % | 0.18 | 0.18 | 0.30 | 0.18 | 0.15 |
| Water-soluble $K_2O$ | % | 0.06 | 0.02 | 0.26 | 0.62 | 0.40 |
| Water-soluble $Na_2O$ | % | 0.02 | 0.03 | 0.06 | 0.07 | 0.04 |
| Water-soluble $Na_2O$-equiv. | % | 0.06 | 0.043 | 0.23 | 0.47 | 0.30 |
| Ignition loss | % | 1.10 | 1.64 | — | 1.01 | 0.88 |
| Blaine | cm$^2$/g | 2920 | | | 3525 | 3705 |
| Time for flow change | min. | 1 | 3 | 3 | 3.5 | 1.25 |
| Cohesion | +/− | + | + | + | + | + |
| Flow | +/− | + | + | − | − | − |
| Initial flow | cm | 8.9 | 8.5 | 0.1 | 0.0 | 0.0 |
| After 20 strokes | cm | 11.3 | 10.5 | 5.1 | 1.7 | 1.9 |
| | | Cement No. | | | | |
| | | 6 | 7 | 8 | 9 | 10 |
| $C_3S$ | % | 49.4 | 49.7 | 64.9 | 47.3 | 68.7 |
| $C_2S$ | % | 22.9 | 25.9 | 13.8 | 30.1 | 13.4 |
| $C_3A$ | % | 7.39 | 3.30 | 8.89 | 10.66 | 7.33 |
| $C_4AF$ | % | 5.87 | 9.98 | 0.88 | 0.85 | 1.07 |
| $CaSO_4$ | % | 5.45 | 2.49 | 3.16 | 1.92 | 1.77 |
| Free CaO | % | 1.04 | 0.81 | 1.57 | 2.15 | 3.28 |
| $K_2O$ | % | 0.91 | 0.69 | 0.12 | 0.12 | 0.27 |
| $Na_2O$ | % | 0.17 | 0.16 | 0.79 | 0.09 | 0.10 |
| Water-soluble $K_2O$ | % | 0.54 | 0.40 | 0.067 | 0.000 | 0.12 |
| Water-soluble $Na_2O$ | % | 0.06 | 0.05 | 0.17 | 0.014 | 0.04 |
| Water-soluble $Na_2O$-equiv. | % | 0.41 | 0.31 | 0.21 | 0.014 | 0.12 |
| Ignition loss | % | 1.35 | 0.83 | 2.99 | 4.43 | 2.72 |
| Blaine | cm$^2$/g | 5245 | 3630 | 4570 | 4085 | 3905 |
| Time for flow change | min. | — | 2 | 3 | 5 | 1 |
| Cohesion | +/− | − | + | + | + | + |
| Flow | +/− | − | − | − | (+) | + |
| Initial flow | cm | 0.0 | 0.1 | 0.2 | 4.9 | 8.0 |
| After 20 strokes | cm | — | 3.2 | 4.1 | 7.8 | 10.1 |
| | | Cement No. | | | | |
| | | 11 | 12 | 13 | 14 | 15 |
| $C_3S$ | % | 59.1 | 60.4 | 53.7 | 45.0 | 65.0 |
| $C_2S$ | % | 20.6 | 17.9 | 27.8 | 33.7 | 16.5 |
| $C_3A$ | % | 9.56 | 6.3 | 1.28 | 9.40 | 5.3 |
| $C_4AF$ | % | 0.91 | 5.1 | 8.74 | 0.97 | 3.5 |
| $CaSO_4$ | % | 3.72 | 2.99 | 3.29 | 3.13 | 2.9 |
| Free CaO | % | 1.95 | 2.2 | 0.85 | 3.62 | 2.6 |
| $K_2O$ | % | 0.03 | 0.29 | 0.94 | 0.08 | 0.20 |
| $Na_2O$ | % | 0.10 | 0.24 | 0.18 | 0.08 | 0.22 |
| Water-soluble $K_2O$ | % | 0.004 | 0.14 | 0.82 | 0.007 | 0.09 |
| Water-soluble $Na_2O$ | % | 0.022 | 0.05 | 0.02 | 0.016 | 0.04 |
| Water-soluble $Na_2O$-equiv. | % | 0.025 | 0.14 | 0.55 | 0.02 | 0.10 |
| Ignition loss | % | 2.67 | — | — | 2.55 | — |
| Blaine | cm$^2$/g | 3725 | | 2920 | 4175 | |
| Time for flow change | min. | 1.5 | 4.5 | 2 | 4 | 3 |
| Cohesion | +/− | + | + | + | + | + |
| Flow | +/− | + | (+) | − | (+) | + |
| Initial flow | cm | 6.3 | 4.0 | 0.6 | 5.6 | 6.7 |
| After 20 strokes | cm | 9.1 | 7.0 | 6.3 | 9.6 | 9.8 |

TABLE 2

| | | Cement No. | | | | |
|---|---|---|---|---|---|---|
| | | 6 | 3 | 7 | 7 | 6 |
| | | Superplasticizer | | | | |
| | | Ca-Cem-Mix | Ca-Cem-Mix | Ca-Cem-Mix | Ca-Flube | Ca-Flube |
| Time for flow change | min. | 3 | 3.25 | 3 | 2 | 1.5 |
| Cohesion | +/− | + | + | + | + | + |
| Flow | +/− | − | − | (+) | (+) | − |
| Initial flow | cm | 2.5 | 2.7 | 4.2 | 3.8 | 1.4 |
| After 20 strokes | cm | 6.0 | 6.0 | 6.6 | 6.5 | 5.0 |

Conclusions

In the experiments covered in Table 1, the contribution of sodium from the superplasticizer was 0.5% calculated on the basis of the cement. From the table it will be clear that cements containing more than 0.2% water-soluble alkali (calculated as $Na_2O$ equivalents) showed very low flowability rendering these cements highly unsuitable for the preparation of DSP-materials. However, Table 2 shows that replacing part of the sodium in the superplasticizer with calcium, thereby, reducing the amount of water-soluble alkali in the mix originating from the mineral solids in the mix, helped restore flowability for cements Nos. 3, 6, and 7.

EXAMPLE 2

The experiments of the present example were conducted to establish that alkali added as part of a superplasticizer does not affect the flowability a DSP-mixture in any undesired manner, whereas water-soluble alkali added in the form of potassium or sodium hydroxide to the DSP-mixture in an amount above approximately 0.25% by weight calculated on the cement reduced the flowability of the DSP-mixture in an undesirable manner.

In the experiment, a white cement was used for the preparation of a DSP-mixture, and varying amounts of KOH, NaOH, and also superplasticizer were added. The cement used had the following data:

TABLE 3

| $SiO_2$ | % | 24.2200 |
|---|---|---|
| $Al_2O_3$ | % | 1.8300 |
| $Fe_2O_3$ | % | 0.3500 |
| CaO | % | 68.9500 |
| MgO | % | 0.5400 |
| $SO_3$ | % | 1.8100 |
| Ignition loss | % | 1.4700 |
| $K_2O$ | % | 0.0200 |
| $Na_2O$ | % | 0.0900 |
| $Na_2O$-equivalents | % | 0.1032 |
| $K_2O$, water-soluble | % | 0.0040 |
| $Na_2O$, water-soluble | % | 0.0200 |
| Water-soluble $Na_2O$-equivalents | % | 0.0226 |
| $C_3S$ | % | 65.2058 |
| $C_2S$ | % | 20.2474 |
| $C_3A$ | % | 4.2573 |
| $C_4AF$ | % | 1.0651 |
| CaSO | % | 2.8504 |
| Free CaO | % | 3.4000 |
| Compressive strength according to DS 427: | | |
| 1 day | MPa | 18.8000 |
| 7 days | MPa | 51.6000 |
| Specific surface | m²/kg | 442.7691 |
| Sieving residues | | |
| 0.02 mm | % | 0.11 |
| 0.09 mm | % | 0.2500 |
| Initial hardening | h/min. | 1.4500 |

TABLE 3-continued

| End hardening | h/min. | 2.1500 |
|---|---|---|
| le Chatelier | mm | 0.0000 |

A number of DSP-mixtures were prepared from the cement with various additions of alkali. The data are shown in Table 4 below.

In the tables, the mixtures having the FIGS. 65 and 80 in their code number contain a total of 0.65%–0.80% $Na_2O$ equivalents, respectively of water-soluble alkali originating from the superplasticizer. In the samples marked "K" and "N", 0.43% $Na_2O$-equivalents originates from the Flube-superplasticizer (added as a 42% by weight aqueous solution, the superplasticizer containing 11% $Na_2O$-equivalents calculated on dry matter). Since the cement in itself contains 0.03% water-soluble $Na_2O$-equivalents, the samples marked 65K and 65N contain 0.2% water-soluble $Na_2O$-equivalents not originating from the superplasticizer. Correspondingly, the samples marked 80K and 80N contain 0.35% water-soluble $Na_2O$-equivalents not originating from the superplasticizer. In the samples marked 65K and 80K, the $Na_2O$-equivalents had been added as potassium hydroxide. In the samples marked 65N and 80N, the $Na_2O$-equivalents had been added as sodium hydroxide. In the samples marked 65F and 80F, the entire amount of added $Na_2O$-equivalents were added as superplasticizer. Furthermore, the DSP-mixtures were prepared as in Example 1.

The detrimental effect on flowability by adding NaOH or KOH to the mixes is thought to be due to the fact that the consequent change in pH and ionic environment may promote the dissolution of precipitated sulphates into the pore liquid, thereby increasing the sulphate ion concentration with the consequent effects.

TABLE 4

| | | Mixture | | | | | | |
|---|---|---|---|---|---|---|---|---|
| | | (0) | 65K | 80K | 65N | 80N | 65F | 80F |
| Cement | | 398.0 | 385.7 | 384.6 | 386.0 | 385.3 | 387.0 | 387.0 |
| Flube 43% sol. | g | 29.0 | 29.0 | 29.0 | 29.0 | 29.0 | 51.9 | 64.5 |
| Water | g | 55.0 | 55.0 | 55.0 | 55.0 | 55.0 | 44.9 | 34.4 |
| KOH | g | 0.0 | 1.33 | 2.38 | 0.0 | 0.0 | 0.0 | 0.0 |
| NaOH | g | 0.0 | 0.0 | 0.0 | 0.95 | 1.70 | 0.0 | 0.0 |
| Addition after 10 min. mixing: | | | | | | | | |
| Flube sol. 42% | g | 7.0 | 7.0 | 7.0 | 7.0 | 7.0 | 7.0 | 7.0 |
| Water | g | 14.0 | 14.0 | 14.0 | 14.0 | 14.0 | 14.0 | 14.0 |
| Time for flow change | min. | 4 | 3 | 5 | 4 | 5 | 3 | 3 |
| Auto flow | cm | 13.0 | 15.0 | 5.5 | 12.5 | 3.0 | 14.5 | 12.0 |
| After 20 strokes | cm | 15.5 | 15.5 | 10.0 | 15.0 | 8.0 | 15.5 | 14.5 |
| Density after ca. 24 hours | g/l | 2423 | 2407 | 2416 | 2421 | 2323 | 2383 | 2349 |

Comments on the Mixtures
Mixture (0): Normal appearance after 10 minutes mixing time. After 10 + 6 minutes excellent flowability since the mixture flows over the edge of the flow table.
Mixture 65K: Behaves as mixture (0).
Mixture 80K: After 10 minutes mixing, the mixture is dough-like, "dead" and without flowability. The mixture appears to stiffen in time. After 10 + 6 minutes, a crusty edge tends to build up along the side of the mixing container.
Mixture 65N: Behavior as mixture (0) both after 10 minutes and 10 + 6 minutes.
Mixture 80N: Visual appearance like mixture 80K after 10 minutes mixing, and after 10 + 6 minutes, the mixture is more foamy and "dead" with respect to flowability than mixture 80K.
Mixture 65F: The mixture was somewhat sticky but had an otherwise excellent flowability. A slight tendency to a crust built-up along the mixing container.
Mixture 80F: Behavior like mixture 65F.

Conclusion

Mixtures 65F and 80F demonstrate that high amounts of alkali, when provided solely through the addition of extra amounts of superplasticizer do not affect the flowability in an undesirable manner. On the other hand, the mixtures involving addition of potassium hydroxide and sodium hydroxide demonstrate that a content of 0.2% water-soluble $Na_2O$-equivalents that does not originate from the superplasticizer does not affect the flowability, but the presence of 0.35% water-soluble $Na_2O$-equivalents that does not originate from the superplasticizer reduces the flowability of the DSP-mixture drastically. This consolidates the assumption that a content of water-soluble $Na_2O$-equivalents (not originating from the superplasticizer) of below approximately 0.25% (based on the cement) does not affect the flowability, whereas contents above the approximately 0.25% will tend to reduce the flowability.

EXAMPLE 3

The experiments described in the present example were conducted to demonstrate that the presence of water-soluble alkali lowers adsorption of concrete superplasticizers on the surface of cement and silica fume. The water soluble alkali was added as sodium sulphate. The cement used was Danish Portland cement (type PC(R/L/H))/, white Portland cement from Aalborg Portland-Cement-Fabrik, Aalborg, Denmark. The silica fume was uncompacted silica fume from ferrosilicon production at Vargen, Sweden. The superplasticizer used was Flube OS 139, a sodium salt of naphthalene sulphonic acid/formaldehyde condensate from Giovanni-Bozetto, Italy.

Methods

Mixes of the following composition were stirred for 10 min. by means of a magnetic stirrer.

| 1st series | cement | 25 g | |
|---|---|---|---|
| | water | 25 g | |
| | superplasticizer | x g, | x = 0.0625; 0.125; 0.1825; 0.25; and 0.375; |
| 2nd series | identical with the first series except that 1.43 g sodium sulphate was added to each mix. | | |
| 3rd series | silica fume | 10 g | |
| | calciumhydroxide | 0.5 g | |
| | water | 25 g | |
| | superplasticizer | x g, | x = 0.2; 0.3; 0.4; and 0.6 |
| 4th series | identical with the third series except that 1.43 g sodium sulphate was added to each mix. | | |

The mixes were separated by filtration or centrifugation.

Superplasticizers of the naphthalene sulphonate-type absorb light in the ultraviolet spectrum with absorption maxima at 230 nm and 290 nm. Using solutions of known content of superplasticizer for calibration it was possible to determine the concentration of dissolved super-plasticizer in the liquid separated from the mixes by measuring absorption of light having a wavelength of 290 nm with a spectrophotometer (Lambda 3, Perkin Elmer). The amount of unadsorbed superplasticizer was calculated, and the amount of superplasticizer adsorbed on the surface of cement or silica fume was calculated by subtracting the amount of unadsorbed superplasticizer from the amount added to the mix(es).

The concentration of alkali ions in the pore solution in the 2nd and 4th series mixes originating from sodium sulphate were equal to the alkali ion concentration in the pore solution originating from mineral solids having water soluble alkali content of 0.40% $Na_2O$ in a mix having a water to powder ratio of 0.20.

| Added superplasticizer | Superplasticizer Remaining dissolved | Superplasticizer Adsorbed |
|---|---|---|
| 1st Series (% of cement weight) | | |
| 0.25 | 0.013 | 0.24 |
| 0.50 | 0.056 | 0.44 |
| 0.75 | 0.19 | 0.56 |
| 1.00 | 0.34 | 0.66 |
| 1.50 | 0.85 | 0.66 |
| 2nd Series (% of cement weight) | | |
| 0.25 | 0.099 | 0.15 |
| 0.50 | 0.28 | 0.22 |
| 0.75 | 0.50 | 0.25 |
| 1.00 | 0.75 | 0.25 |
| 1.50 | 1.22 | 0.28 |
| 3rd Series (% of cement weight) | | |
| 2.0 | 0.18 | 1.82 |
| 3.0 | 0.40 | 2.60 |
| 4.0 | 0.88 | 3.12 |
| 6.0 | 2.29 | 3.71 |
| 4th Series (% of cement weight) | | |
| 2.0 | 1.01 | 0.99 |
| 3.0 | 1.80 | 1.20 |
| 4.0 | 2.46 | 1.55 |
| 6.0 | 4.11 | 1.89 |

Conclusion

The addition of water-soluble alkali in the form of sodium sulphate dramatically reduces the adsorption of superplasticizer on both cement and silica fume.

We claim:

1. A method for preparing a shaped article with a binder matrix prepared from a mix consisting essentially of a Portland cement, a fine silica-rich powder, water and a concrete superplasticizer, in the proportions of at least 0.1 part of the silica-rich powder, up to 0.35 part water, and from 0.01 to 0.04 part of the concrete superplasticizer dry matter per part by weight of the mixture of the cement and silica-rich powder, the method comprising (a) selecting the cement and fine silica-rich powder by measuring the contents of water-soluble Na and K in the cement and the fine silica-rich powder, calculating the contents of water-soluble Na and K as $Na_2O$-equivalents, and selecting a cement and a fine silica-rich powder that will result in a content of water-soluble alkali metal in the mix originating from the cement or the fine silica-rich powder of at the most 0.30%, calculated as $Na_2O$ equivalents, based on the weight of the cement in the mix, (b) preparing a mix comprising the cement, the fine silica-rich powder, water, and a concrete superplasticizer, (c) arranging the mix in a shaped configuration and allowing the mix to solidify.

2. A method according to claim 1 wherein the content of water-soluble alkali metal in the mix, based on the weight of the cement, is at the most 0.25%.

3. A method according to claim 2 wherein the content of water-soluble alkali metal in the mix, based on the weight of the cement, is at the most 0.20%.

4. A method according to claim 1 wherein the water-soluble alkali metal is present as alkali metal sulphate.

5. A method according to claim 1 wherein additional bodies selected from the group consisting of sand, stone aggregate, or mixtures thereof; steel, plastic, glass, asbestos, cellulose, mineral or organic fibers; and metallic or non-metallic whiskers are added to the mix.

6. A method according to claim 1 wherein the fine silica-rich powder is selected from artificial fine silica, fly ash from power plants and diatomaceous earth.

7. A method according to claim 6 wherein the fine silica-rich powder comprises ultra-fine silica fume produced as a by-product in the production of silicon or ferrosilicon in electric furnaces.

8. A method according to claim 1 wherein the mix has a fluid to plastic consistency with a weight ratio between water and cement plus fine silica-rich powder of at the most 0.30.

9. A method according to claim 8 wherein the ratio between water and cement plus fine silica-rich powder is at the most 0.25.

10. A method according to claim 9 wherein the ratio between water and cement plus fine silica-rich powder is at the most 0.20.

11. A method according to claim 10 wherein the ratio between water and cement plus fine silica-rich powder is at the most 0.15.

12. A method according to claim 1 wherein the proportion of the fine silica-rich powder in the mix is at least 15% by weight, based on the weight of the cement and the fine silica-rich powder.

13. A method according to claim 12 wherein the proportion of the fine silica-rich powder in the mix is at least 20% by weight, based on the weight of the cement and the fine silica-rich powder.

14. A method according to claim 13 wherein the proportion of the fine silica-rich powder in the mix is at least 30% by weight, based on the weight of the cement and the fine silica-rich powder.

15. A method according to claim 14 wherein the proportion of the fine silica-rich powder in the mix is at least 40% by weight, based on the weight of the cement and the fine silica-rich powder.

16. A method according to claim 1 wherein the concrete superplasticizer is a salt of a naphthalene sulphonic acid/formaldehyde condensate or a melamine sulphonic acid/formaldehyde condensate.

17. A method according to claim 1 wherein the particle size of the fine silica-rich powder is from about 50 Angstroms to about 0.5 micron, and the cement particles have a particle size of from about 0.5 to 100 microns, and are at least one order of magnitude larger than the respective fine silica-rich particles.

18. A method according to claim 17 in which the fine silica-rich powder particles have a specific surface area of about 50,000 to 2,000,000 cm$^2$/g.

19. A method according to claim 18 wherein the fine silica-rich powder particles have a specific surface area of about 250,000 cm$^2$/g.

20. A method according to claim 17 wherein the cement particles are admixed with other particles of substantially the same size selected from the group consisting of fine sand, fly ash and fine chalk.

21. A method according to claim 20 wherein the mix comprises additionally bodies selected from the group consisting of sand, stone aggregate, or mixtures thereof; steel, plastic, glass, asbestos, cellulose, mineral or organic fibers; and metallic or non-metallic whiskers, the additional bodies having at least one dimension which is at least one order of magnitude larger than the cement particles.

22. A method according to claim 17 wherein the mix comprises additional bodies selected from the group consisting of sand, stone aggregate or mixtures thereof; steel, plastic, glass, asbestos, cellulose, mineral or organic fibers; and metallic or non-metallic whiskers, the additional bodies having at least one dimension which is at least one order of magnitude larger than the cement particles.

23. A method for preparing a shaped article with a binder matrix shaped from a mix consisting essentially of a Portland cement, a fine silica-rich powder, water and a concrete superplasticizer, in the proportions of at least 0.1 part of the silica-rich powder, up to 0.35 part water, and from 0.01 to 0.04 part of the concrete superplasticizer dry matter per part by weight of the mixture of the cement and silica-rich powder, comprising
(a) preparing a mix comprising the cement, the fine silica-rich powder, water, and a concrete superplasticizer,
(b) reducing the content of water-soluble alkali metal in the mix originating from the cement or the fine silica-rich powder to at the most 0.30%, calculated as Na$_2$O equivalents, based on the weight of the cement, by adding to the mix or to any of the constituents of the mix a compound selected from the group consisting of (1) a water-soluble salt comprising non-alkali metal cations capable of forming a substantially insoluble precipitate with sulphate ions, (2) an acid capable of forming a soluble calcium salt, and (3) a salt comprising non-alkali metal cations and capable of forming a soluble calcium salt by reaction with calcium hydroxide, and
(c) arranging the mix in a shaped configuration and allowing the mix to solidify.

24. A method according to claim 23 wherein the content of water-soluble alkali metal in the mix, based on the weight of the cement, is reduced to at the most 0.25%.

25. A method according to claim 24 wherein the content of water-soluble alkali metal in the mix, based on the weight of the cement, is reduced to at the most 0.20%.

26. A method according to claim 23 wherein the water-soluble alkali metal is alkali metal sulphate.

27. A method according to claim 23 wherein the non-alkali metal cations are Ca$^{2+}$ ions.

28. A method according to claim 23 wherein additional bodies selected from the group consisting of sand, stone aggregate, or mixtures thereof; steel, plastic, glass, asbestos, cellulose, mineral or organic fibers; and metallic or non-metallic whiskers are incorporated in the mix.

29. A method according to claim 23 wherein the fine silica-rich powder is selected from artificial fine silica, fly ash from power plants and diatomaceous earth.

30. A method according to claim 29 wherein the fine silica-rich powder comprises ultra-fine silica fume produced as a by-product in the production of silicon or ferrosilicon in electric furnaces.

31. A method according to claim 23 wherein the mix has a fluid to plastic consistency with a weight ratio between water and cement plus fine silica-rich powder of at the most 0.30.

32. A method according to claim 31 wherein the ratio between water and cement plus fine silica-rich powder is at the most 0.25.

33. A method according to claim 32 wherein the ratio between water and cement plus silica-rich powder is at the most 0.20.

34. A method according to claim 33 wherein the ratio between water and cement plus fine silica-rich powder is at the most 0.15.

35. A method according to claim 23 wherein the proportion of the fine silica-rich powder in the mix is at least 15% by weight, based on the weight of the cement and the fine silica-rich powder.

36. A method according to claim 35 wherein the proportion of the fine silica-rich powder in the mix is at least 20% by weight, based on the weight of the cement and the fine silica-rich powder.

37. A method according to claim 36 wherein the proportion of the fine silica-rich powder in the mix is at least 30% by weight, based on the weight of the cement and the fine silica-rich powder.

38. A method according to claim 37 wherein the proportion of the fine silica-rich powder in the mix is at least 40% by weight, based on the weight of the cement and the fine silica-rich powder.

39. A method according to claim 23 wherein at least part of the salt-forming cations of the concrete superplasticizer are non-alkali metal cations.

40. A method according to claim 23 wherein the concrete superplasticizer is a salt of a naphthalene sulphonic acid/formaldehyde condensate or a melamine sulphonic acid/formaldehyde condensate.

41. A method according to claim 23 wherein the particle size of the fine silica-rich powder is from about 50 Angstroms to about 0.5 micron and the cement particles have a particle size of from about 0.5 to 100 microns and are at least one order of magnitude larger than the respective fine silica-rich particles.

42. A method according to claim 41 wherein the fine silica-rich particles have a specific surface area of about 50,000 to 2,000,000 $cm^2g$.

43. A method according to claim 42 wherein the fine silica-rich particles have a specific surface area of about 250,000 $cm^2/g$.

44. A method according to claim 41 wherein the cement particles are admixed with other particles of substantially the same size selected from the group consisting of fine sand, fly ash and fine chalk.

45. A method according to claim 44 wherein the mix comprises additional bodies selected from the group consisting of sand, stone aggregate, or mixtures thereof; steel, plastic, glass, asbestos, cellulose, mineral or organic fibers; and metallic or non-metallic whiskers, the additional bodies having at least one dimension which is at least one order of magnitude larger than the cement particles.

46. A method according to claim 41 wherein the mix comprises additional bodies selected from the group consisting of sand, stone aggregate or mixtures thereof; steel, plastic, glass, asbestos, cellulose, mineral or organic fibers; and metallic or non-metallic whiskers, the additional bodies having at least one dimension which is at least one order of magnitude larger than the cement particles.

47. A dry mix for preparing a shaped article with a binder matrix based on cement and fine silica-rich powder, the mix consisting essentially of a Portland cement, a fine silica-rich powder and a concrete superplasticizer, in the proportions of at least 0.1 part of the silica-rich powder and from 0.1 to 0.04 part of the concrete superplasticizer dry matter per part by weight of the mixture of the cement and silica-rich powder; the mix being adapted to be prepared in admixture with water in a weight ratio between water and cement plus fine silica-rich powder of at the most 0.35, the mix further comprising (1) a water-soluble salt comprising non-alkali metal cations capable of forming a substantially insoluble precipitate with sulphate ions, (2) an acid capable of forming a soluble calcium salt, or (3) a salt comprising non-alkali metal cations, said salt being capable of forming a soluble calcium salt by reaction with calcium hydroxide, whereby the amount of water-soluble alkali metal in the mix originating from the cement or the fine silica-rich powder is at the most 0.30%, calculated as $Na_2O$ equivalents, based on the weight of the cement in the mix.

48. A wet mix for preparing a shaped article with a binder matrix based on cement and fine silica-rich powder, the mix consisting essentially of a Portland cement, a fine silica-rich powder, water and a concrete superplasticizer, in the proportions of at least 0.1 part of the silica-rich powder, up to 0.35 part water, and from 0.01 to 0.04 part of the concrete superplasticizer dry matter per part by weight of the mixture of the cement and silica-rich powder, the mix further comprising (1) a water-soluble salt comprising non-alkali metal cations capable of forming a substantially insoluble precipitate with sulphate ions, (2) an acid capable of forming a soluble calcium salt, or (3) a salt comprising non-alkali metal cations, said salt being capable of forming a soluble calcium salt by reaction with calcium hydroxide, whereby the amount of water-soluble alkali metal in the mix originating from the cement or the fine silica-rich powder is at the most 0.30%, calculated as $Na_2O$ equivalents, based on the weight of the cement in the mix.

* * * * *